United States Patent
Lomax

(10) Patent No.: US 10,370,844 B2
(45) Date of Patent: Aug. 6, 2019

(54) SECURING ASSEMBLY

(71) Applicant: ONGUARD GROUP LIMITED, Christchurch (NZ)

(72) Inventor: William James Lomax, Christchurch (NZ)

(73) Assignee: ONGUARD GROUP LIMITED (NZ)

( * ) Notice: Subject to any disclaimer, the term of this patent is extended or adjusted under 35 U.S.C. 154(b) by 0 days.

(21) Appl. No.: 15/549,390

(22) PCT Filed: Jun. 1, 2016

(86) PCT No.: PCT/IB2016/053203
§ 371 (c)(1),
(2) Date: Aug. 8, 2017

(87) PCT Pub. No.: WO2016/193913
PCT Pub. Date: Dec. 8, 2016

(65) Prior Publication Data
US 2018/0073241 A1     Mar. 15, 2018

(30) Foreign Application Priority Data

Jun. 3, 2015 (NZ) ........................................ 708749
Aug. 10, 2015 (NZ) ........................................ 710893

(51) Int. Cl.
*E04B 1/41* (2006.01)
*F16B 9/02* (2006.01)
(Continued)

(52) U.S. Cl.
CPC .......... *E04B 1/4157* (2013.01); *E04B 1/4121* (2013.01); *F16B 9/026* (2013.01);
(Continued)

(58) Field of Classification Search
CPC ........ E04B 1/41; E04B 1/4114; E04B 1/4121; E04B 1/4128; E04B 1/4135;
(Continued)

(56) References Cited

U.S. PATENT DOCUMENTS 913,875 A  *  3/1909  Temple ................. E04B 1/4107
                                                          411/427
991,517 A  *  5/1911  Kennedy ............... E04B 1/4121
                                                          52/708
(Continued)

FOREIGN PATENT DOCUMENTS

| JP | 08-312024 | 11/1996 |
|----|-----------|---------|
| WO | WO 2006/009476 | 1/2006 |
| WO | WO 2015/068098 | 5/2015 |

*Primary Examiner* — James M Ference
*Assistant Examiner* — Kyle J. Walraed-Sullivan
(74) *Attorney, Agent, or Firm* — Galbreath Law Offices, P.C.; John A. Galbreath

(57) ABSTRACT

A securing assembly for an article, said assembly being capable of securing against both tensile and compressive forces, and including: •a casing which in use is rigidly attached to an article to be secured; •a securing rod which is adapted to be releasably connectable between a floor underlying an article to be secured and said article; •the securing rod providing a first portion at one end thereof and a second portion at the other end thereof, and a third portion having reduced strength compared to said first and second portions, between said first and second portions; •a bearing dimensioned and arranged to support at least a major portion of said third part of said rod; •said casing being arranged to completely surround and contain at least said third portion of said rod; •said casing being in load transmitting engagement with said rod.

21 Claims, 12 Drawing Sheets

(51) Int. Cl.
*F16M 5/00* (2006.01)
*F16M 7/00* (2006.01)
*F16M 9/00* (2006.01)

(52) U.S. Cl.
CPC ............... *F16M 5/00* (2013.01); *F16M 7/00* (2013.01); *F16M 9/00* (2013.01)

(58) Field of Classification Search
CPC ........ E04B 1/4157; E04B 1/4164; F16B 9/01; F16B 9/026; F16M 9/00; E04H 9/021; E04H 12/2269; E04H 7/06; E04H 7/18; E04H 7/04; E04H 7/30; F17C 2201/032; F17C 2201/052; F17C 2201/033; B65D 88/08; B65F 1/141
USPC .... 52/745.21, 699, 700, 701, 705, 706, 707, 52/708, 711, 295, 298, 745.01; 220/565, 220/560.05, 475, 628
See application file for complete search history.

(56) References Cited

U.S. PATENT DOCUMENTS

| | | | | |
|---|---|---|---|---|
| 1,118,159 A * | 11/1914 | Smith | E04B 1/41 | 52/553 |
| 1,445,938 A * | 2/1923 | Farrington | E04F 11/1812 | 403/189 |
| 1,503,148 A * | 7/1924 | Bernstrom | E04F 21/05 | 220/DIG. 32 |
| 2,643,573 A * | 6/1953 | Johnson | F16B 13/0833 | 29/453 |
| 2,952,947 A * | 9/1960 | White | F16M 7/00 | 411/81 |
| 3,041,913 A * | 7/1962 | Liska | F16B 5/0208 | 285/148.27 |
| 3,058,386 A * | 10/1962 | Morrow | F16B 7/025 | 24/136 B |
| 3,275,181 A * | 9/1966 | Leclou | B65D 90/12 | 220/565 |
| 3,403,594 A * | 10/1968 | Newell | E21D 21/008 | 269/100 |
| 3,521,413 A * | 7/1970 | Scott | E01F 9/635 | 248/158 |
| 3,559,835 A * | 2/1971 | Lange | F17C 3/022 | 220/560.05 |
| 3,585,771 A * | 6/1971 | Pinniger | E04B 1/215 | 52/251 |
| 3,651,648 A * | 3/1972 | Hamilton | E04H 7/065 | 220/560.12 |
| 3,687,149 A * | 8/1972 | Wissmiller | F16K 17/383 | 137/72 |
| 3,782,061 A * | 1/1974 | Minutoli | E04B 1/06 | 52/125.5 |
| 3,805,533 A * | 4/1974 | Askey | E21D 21/0046 | 405/259.6 |
| 3,917,104 A * | 11/1975 | Rossitto | B65D 88/08 | 220/560.15 |
| 3,927,497 A * | 12/1975 | Yoshinaga | E02D 27/38 | 52/169.1 |
| 4,041,722 A * | 8/1977 | Terlesky | F17C 3/022 | 165/45 |
| 4,108,407 A * | 8/1978 | Cable | F16B 5/0233 | 248/188.4 |
| 4,281,487 A * | 8/1981 | Koller | F16F 7/125 | 248/351 |
| 4,293,259 A * | 10/1981 | Liebig | F16B 13/0833 | 411/32 |
| 4,316,689 A * | 2/1982 | Sanchez Velasco | F16B 13/0833 | 411/60.2 |
| 4,408,940 A * | 10/1983 | Fischer | E04B 1/4164 | 248/679 |
| 4,652,193 A * | 3/1987 | Hibbs | F16B 13/143 | 411/82.3 |
| 4,656,806 A * | 4/1987 | Leibhard | F16B 13/065 | 411/15 |
| 4,702,656 A * | 10/1987 | Kerrom | F16B 13/0833 | 411/21 |
| 4,783,039 A * | 11/1988 | Peterson | B60G 99/004 | 248/634 |
| 4,863,329 A * | 9/1989 | Wilson | F16B 5/02 | 411/339 |
| 4,934,885 A * | 6/1990 | Woods | F16B 5/0233 | 24/453 |
| 5,105,590 A * | 4/1992 | Dykmans | B65D 88/34 | 52/745.01 |
| 5,110,082 A * | 5/1992 | Rowan, Jr. | F16M 7/00 | 248/649 |
| 5,177,919 A * | 1/1993 | Dykmans | B65D 88/34 | 405/229 |
| 5,257,490 A * | 11/1993 | Endo | E04F 13/0835 | 52/506.05 |
| 5,315,800 A * | 5/1994 | Weber | E04B 1/4157 | 411/82 |
| 5,542,225 A * | 8/1996 | Endo | E04F 13/045 | 52/511 |
| 5,546,723 A * | 8/1996 | Jones | E04B 1/0007 | 411/163 |
| 5,562,377 A * | 10/1996 | Giannuzzi | F16B 13/141 | 405/259.5 |
| 5,653,078 A * | 8/1997 | Kies | E04B 1/4121 | 49/504 |
| RE35,659 E * | 11/1997 | Ernst | F16B 13/141 | 405/259.5 |
| 5,682,678 A * | 11/1997 | Gallagher | F16B 5/01 | 29/402.15 |
| 5,690,456 A * | 11/1997 | Wedellsborg | F16B 31/04 | 411/263 |
| 5,772,378 A * | 6/1998 | Keto-Tokoi | B23P 19/068 | 411/432 |
| 5,857,817 A * | 1/1999 | Giannuzzi | C09J 9/005 | 405/259.5 |
| 5,904,066 A * | 5/1999 | Lehman | E04H 9/021 | 254/98 |
| 6,015,138 A * | 1/2000 | Kohlberger | E04F 11/1812 | 256/65.14 |
| 6,055,790 A * | 5/2000 | Lunde | E04C 2/365 | 52/787.1 |
| 6,085,472 A * | 7/2000 | Malhotra | E04H 9/02 | 248/188.1 |
| 6,238,128 B1 * | 5/2001 | Kaibach | F16B 13/063 | 403/297 |
| 6,367,205 B2 * | 4/2002 | Cornett, Sr. | E04B 7/02 | 52/223.13 |
| 6,484,471 B2 * | 11/2002 | Steed | F16B 13/141 | 405/259.5 |
| 6,902,140 B1 * | 6/2005 | Huang | E06C 7/44 | 248/188.2 |
| 7,121,780 B2 * | 10/2006 | Matich | F16B 5/02 | 411/367 |
| 7,441,743 B2 * | 10/2008 | Behlinger | F16M 7/00 | 248/679 |
| 7,520,102 B1 * | 4/2009 | diGirolamo | E04B 1/4157 | 52/293.1 |
| 7,707,782 B2 * | 5/2010 | Dureiko | B01D 53/18 | 52/25 |
| 8,556,559 B2 * | 10/2013 | Hsieh | F16B 39/02 | 411/133 |
| 8,678,730 B2 * | 3/2014 | Gaudron | F16B 13/065 | 411/37 |
| 8,950,159 B2 * | 2/2015 | Cove | B29C 65/08 | 52/376 |
| 9,091,064 B1 * | 7/2015 | Dahl | E04C 5/122 | |
| 9,249,591 B2 * | 2/2016 | Sugita | F16F 15/02 | |
| 9,441,389 B2 * | 9/2016 | Shiomi | E04H 7/06 | |
| 10,077,893 B1 * | 9/2018 | Abraham | A45F 3/44 | |
| 2002/0066246 A1* | 6/2002 | Leek | E04B 1/0007 | 52/295 |

(56) References Cited

U.S. PATENT DOCUMENTS

| | | | |
|---|---|---|---|
| 2004/0164473 A1* | 8/2004 | Qutub | E04H 9/021 267/201 |
| 2004/0228704 A1* | 11/2004 | Rotshtain | A47B 57/26 411/408 |
| 2005/0163588 A1* | 7/2005 | Gass | F16B 9/026 411/107 |
| 2005/0284083 A1* | 12/2005 | Gridley | E04B 1/4157 52/698 |
| 2007/0095004 A1* | 5/2007 | Heath | E04B 1/4157 52/741.1 |
| 2007/0170342 A1* | 7/2007 | Schneider | F16B 9/026 248/548 |
| 2008/0282640 A1* | 11/2008 | Mathews | F16G 11/106 52/711 |
| 2008/0302060 A1* | 12/2008 | Ciprian | B64C 1/06 52/787.12 |
| 2009/0041550 A1* | 2/2009 | Oldsen | E21D 20/025 405/259.3 |
| 2009/0044482 A1* | 2/2009 | Tooman | E02D 27/42 52/699 |
| 2009/0272053 A1* | 11/2009 | Dent | E02D 27/32 52/296 |
| 2009/0288356 A1* | 11/2009 | Fitzpatrick | E02D 27/00 52/295 |
| 2010/0107545 A1* | 5/2010 | Montague | E04B 1/24 52/699 |
| 2010/0199592 A1* | 8/2010 | Ash | F16B 13/0891 52/705 |
| 2010/0212250 A1* | 8/2010 | McSherry | F16B 13/066 52/704 |
| 2011/0036025 A1* | 2/2011 | Boulay | E02D 5/801 52/157 |
| 2011/0179748 A1* | 7/2011 | Gee | B28B 23/005 52/745.21 |
| 2011/0192111 A1* | 8/2011 | White | E04B 1/4121 52/699 |
| 2011/0227298 A1* | 9/2011 | Teng | E04B 1/66 277/645 |
| 2011/0277396 A1* | 11/2011 | Schneider | F16B 5/0233 52/126.7 |
| 2011/0296788 A1* | 12/2011 | Cove | B29C 65/08 52/704 |
| 2011/0314768 A1* | 12/2011 | Johnson | B25B 13/065 52/745.21 |
| 2012/0180423 A1* | 7/2012 | Avila | E04B 1/4157 52/700 |
| 2012/0325821 A1* | 12/2012 | Mookerjee | F17C 3/022 220/560.1 |
| 2013/0025234 A1* | 1/2013 | Lin | E04B 1/4157 52/699 |
| 2013/0067849 A1* | 3/2013 | Espinosa | E04B 1/4121 52/699 |
| 2014/0223854 A1* | 8/2014 | Gilling | E04C 5/165 52/745.21 |
| 2015/0053692 A1* | 2/2015 | Uchiyama | E04H 7/18 220/560.1 |
| 2015/0096242 A1* | 4/2015 | Lin | E04G 15/04 52/125.5 |
| 2015/0284967 A1* | 10/2015 | Kim | E04C 5/12 52/125.4 |
| 2015/0292207 A1* | 10/2015 | Prowse | E04C 5/165 52/707 |
| 2016/0108948 A1* | 4/2016 | Hettich | F16B 13/00 411/54 |
| 2016/0251846 A1* | 9/2016 | Kanno | F17C 3/022 52/703 |
| 2016/0273700 A1* | 9/2016 | Lomax | F16M 7/00 |
| 2017/0122354 A1* | 5/2017 | Guerra | F16B 9/026 |
| 2017/0167130 A1* | 6/2017 | Bellerive | E04B 1/4164 |

* cited by examiner

SECURING ASSEMBLY

TECHNICAL FIELD

The present invention relates to a securing assembly for permanently or semi-permanently securing large articles to a floor (this term includes any supporting underlying structure), in such a way as to secure the article against tensile, compressive and shear forces. In particular, the securing assembly of the present invention is useful for securing large articles against the seismic forces generated by earthquakes.

The securing assembly of the present invention has been developed for anchoring wine tanks, and will therefore be described with particular reference to that application. However, it will be appreciated that the securing assembly of the present invention could be used to secure any of a wide range of articles, e.g. dairy holding tanks, petrochemicals tanks, mobile homes.

BACKGROUND ART

Wine tanks usually are a tall cylindrical structure with a conical top, and supported at the base upon legs or upon a base plinth. The smaller tanks typically have a capacity of about 1200 liters, but the largest tanks may hold up to 580,000 liters. Some of the tanks are up to 20 meters high and up to 10 meters in diameter, although a 6 meter diameter is more common.

Wine tanks typically are made of stainless steel, and the tank walls may include refrigeration coils and one or more layers of insulation.

It will be apparent from the above that wine tanks present the problem of securing a tall, relatively delicate structure, which when full is extremely heavy.

It is known to secure wine tanks using an anchoring bracket of the type shown in FIG. 1: —an open fronted casing 10 with spaced apart parallel sides 11, top plate 12, and bottom plate 13 is welded on to the side of a tank 14, and a screw threaded rod 15 passes through apertures 16, 17 in the top and bottom plates respectively. The lower end 15a of the rod 15 is concreted into the underlying floor 19, to retain the tank in position. A number of these anchoring brackets are located around the perimeter of the tank.

The above described construction has major drawbacks:
if the rod 15 yields, (e.g. as a result of the movement of the tank in an earthquake) then the surrounding floor must be dug up to release the lower end of the rod, so that the damaged rod can be replaced;
if the rod 15 has been stretched, the securing nut 18 will be spaced above the top plate 12, and the rod therefore will not restrain movement of the tank at all, until the tank moves enough to bring the top plate 12 back into contact with the nut 18.

DISCLOSURE OF INVENTION

An object of the present invention is the provision of a securing assembly which overcomes one or both of the above described drawbacks.

The present invention provides a securing assembly for an article, said assembly being capable of securing against both tensile and compressive forces, and including:
a casing which in use is rigidly attached to an article to be secured;
a securing rod which is adapted to be releasably connectable between a floor underlying an article to be secured and said article;
the securing rod providing a first portion at one end thereof and a second portion at the other end thereof, and a third portion having reduced strength compared to said first and second portions, between said first and second portions;
a bearing dimensioned and arranged to support at least a major portion of said third part of said rod;
said casing being arranged to completely surround and contain at least said third portion of said rod;
said casing being in load transmitting engagement with said rod.

Preferably, the casing is in the form of a cylinder having a first end which is upper most in use and a second end which is lower most in use; the casing is formed with a bore through it, extending between the first and second ends.

Preferably, the longitudinal axis of the bore is parallel to, but displaced from, the longitudinal axis of the casing.

Preferably also, at least the third portion of the securing rod and the corresponding part of the bearing are a sliding fit within the bore.

In a preferred embodiment of the invention, the first end of the bore is provided with a removable top, one face of which is formed with a cavity dimensioned to receive at least part of the first portion of the securing rod, such that when the top is secured over the first end of the bore, it provides a load transmitting engagement between the securing rod and the casing. The removable top may be screw threaded or twist-locked onto the first end of the bore.

Preferably, the second portion of the securing rod is provided with a screw thread for connection between the securing rod and the floor. The second portion of the rod may be internally screw threaded for screw threaded engagement with an externally screw threaded base pin securable to the floor; alternatively, the second portion of the rod may be externally screw threaded for the screw threaded engagement with an internally screw threaded connector. The screw threaded connector may be a screw threaded sleeve or a screw threaded boss, and may be engaged with a base pin which is securable to the floor, or may be directly connected to the floor or to a base plate connected to the floor. Another possibility is to replace the screw-threaded connections with twist-lock connections.

Preferably, the connector extends into the second end of the bore and for some applications of the securing assembly it is preferred that the connector extends into the second end of the bore by a distance equal to about one third to one half of the length of the casing. The portion of the connector extending into the second end of the bore, or at least a major portion of that connector, may be surrounded by a load friction bearing.

In a further embodiment of the present invention, the first end of the casing is closed by a plate secured over the end of the casing; the plate has an aperture through it which receives at least part of the first portion of the securing rod and is provided with means for releasably securing the first portion of the securing rod. This means may be in the form of an internally screw threaded connector dimensioned to receive and engage an external screw thread formed on said at least part of the first portion of the securing rod. Alternatively, twist-lock connections may replace the screw-threaded connections.

In said further embodiment, the second portion of the securing rod preferably is releasably securable to the casing by means of a screw threaded engagement, and the casing itself is provided with an external screw thread over at least part of its length, so that the casing can be screwed into or out of an internally screw threaded base socket, to adjust the overall length of the combined casing and socket.

It will be appreciated from the following description that the design of each securing assembly is such that the response of an article such as a tank to an event such as an earthquake is controlled by means of the controlled yielding of each rod of each securing assembly. Thus, the rod of the securing assembly is designed to be the weakest point of the assembly. The controlled yielding of each rod absorbs considerable energy, whether the rod is yielding under tensile stress or under compressive stress.

BRIEF DESCRIPTION OF THE DRAWINGS

By way of example only, a preferred embodiment of the present invention is described in detail with reference to the accompanying drawings, in which:—

FIG. 7a is a plan view of the securing assembly of FIG. 7;

BEST MODE FOR CARRYING OUT THE INVENTION

Figure 1:
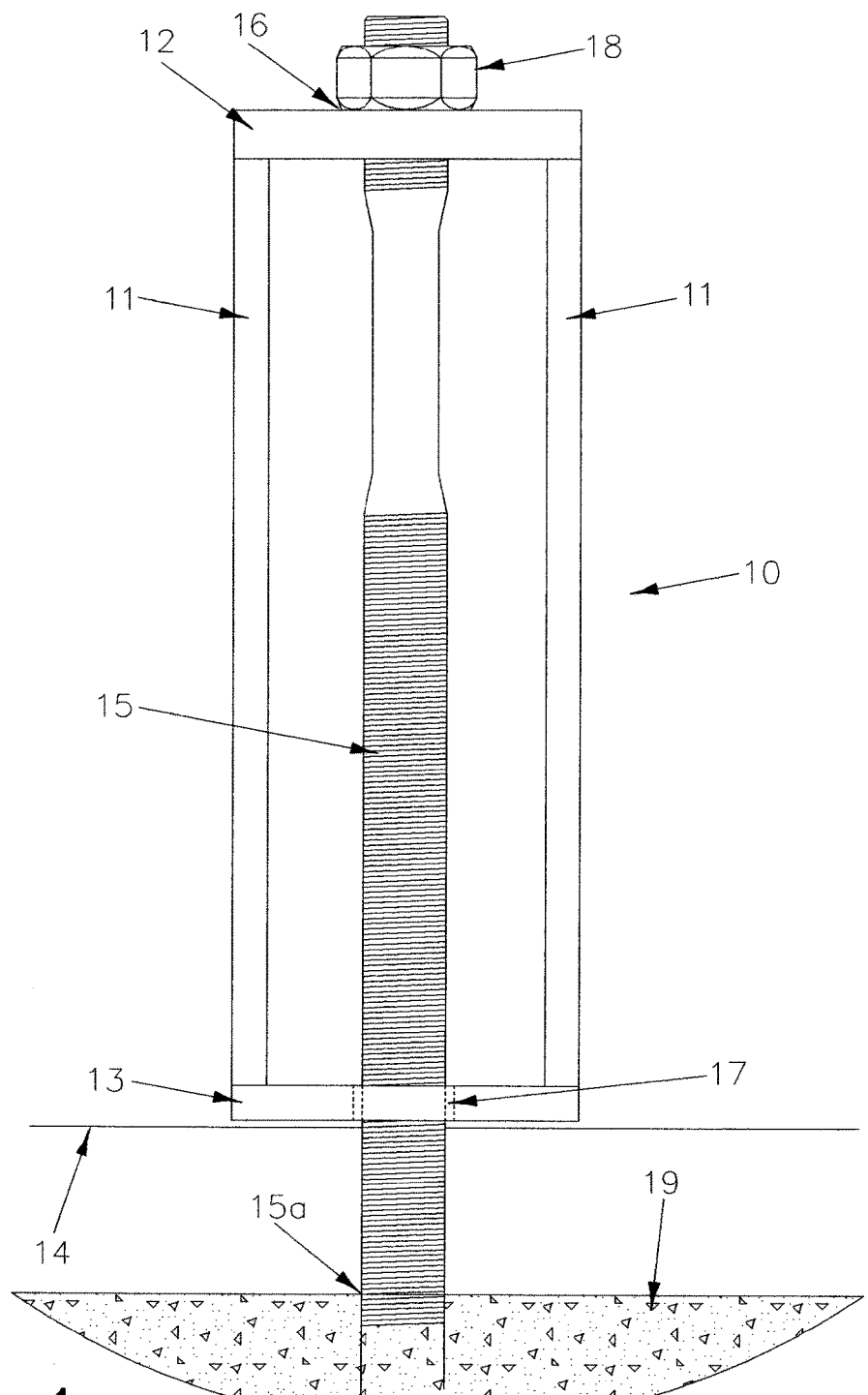
FIG. 1 is a side view of an anchoring bracket in accordance with the prior art.
Figure 2:
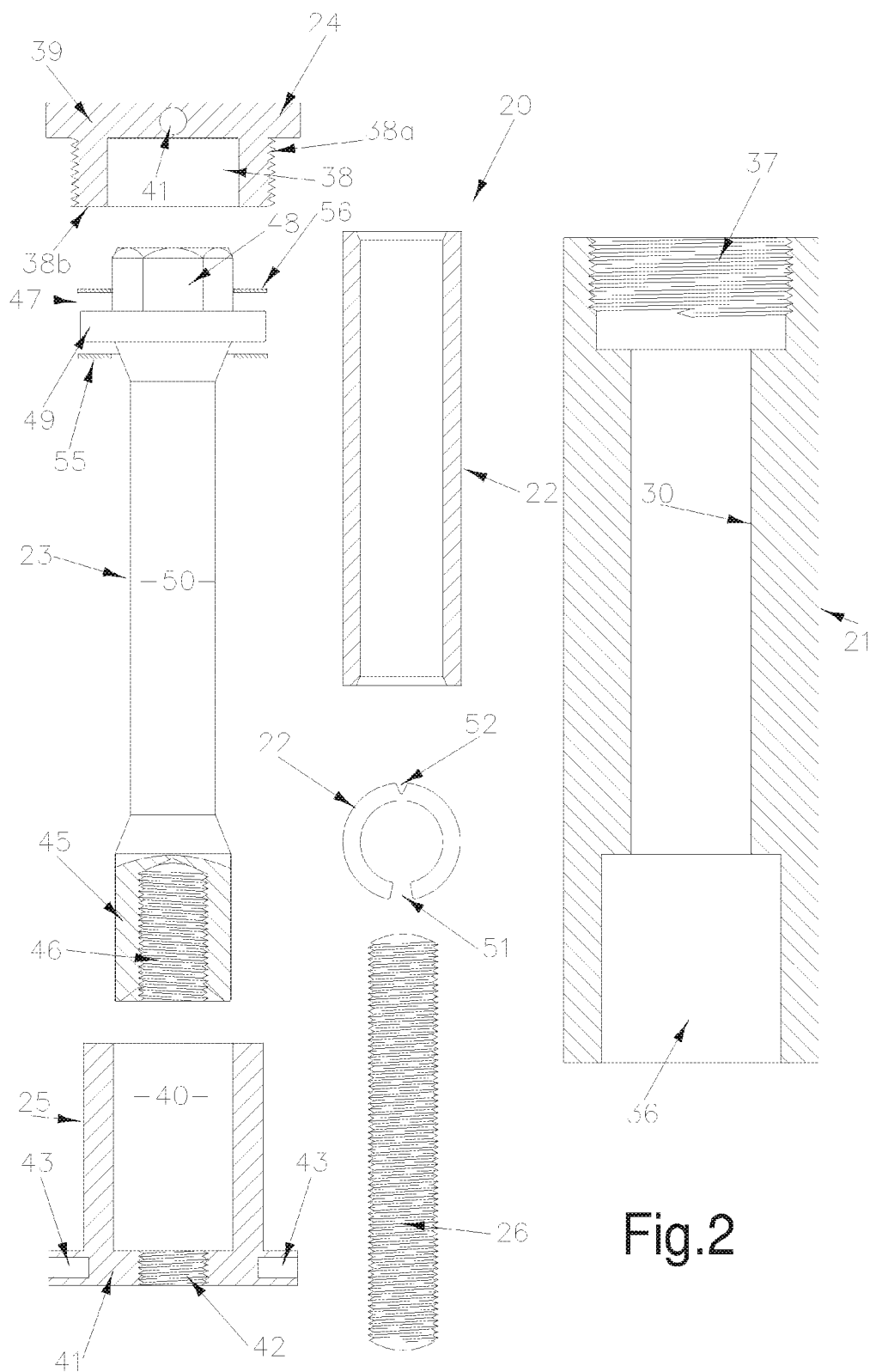
FIG. 2 is an exploded view of the component parts of a first embodiment of a securing assembly in accordance with the present invention.

Referring to FIGS. 2-6, a securing assembly 20 in accordance with the present invention includes a casing 21, a bearing 22, a securing rod 23, a top 24, a socket 25, and a base pin 26.

Figure 6:
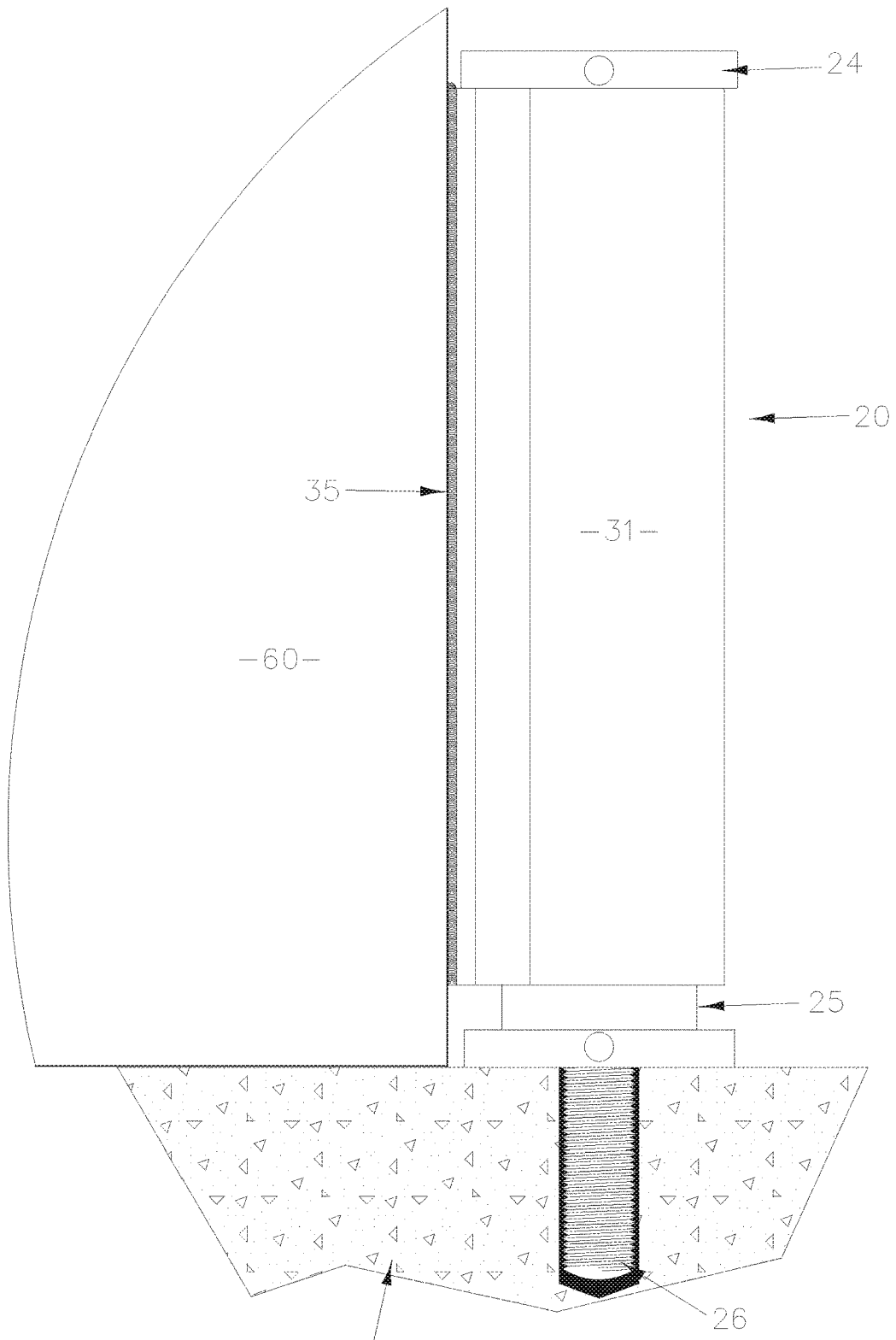
FIG. 6 is a side view of the securing assembly of FIGS. 2-5.

The casing 21 is in the form of a hollow cylinder (i.e. with a longitudinal bore therethrough) with a first end (uppermost in use) and a second end (lowermost in use). As shown in FIGS. 5a/b, the inner wall 30 of the cylinder is circular in cross-section, but the outer wall 31 is shaped to form a pair of inclined shoulders 32 separated by a flat 33 which extends down the full length of the casing. The junctions between each shoulder 32 and the flat 33 provide a pair of spaced corners 34 each extending the full length of the casing 21; these corners 34 each provide a location for a line of welding 35, as shown in FIG. 6. The welds are used to attach the securing assembly to the article to be secured, as hereinafter described.

The inner wall 30 of the casing 21 is reduced in thickness adjacent its base, to provide a socket aperture 36. Adjacent the top of the casing, the inner wall 30 also is reduced in wall thickness, and is screw threaded to provide an internally screw threaded aperture 37.

The top 24 is formed with a hollow cylindrical portion 38 which has an external screw thread 38 *a*, dimensioned and arranged to be engageable with the screw thread on the aperture 37. The top 24 also provides a flange 39 of greater diameter than the screw threaded portion. A series of tool sockets 41 are equidistantly spaced around the perimeter of the flange 39.

The socket 25 provides a first portion 40 in the shape of a hollow cylinder which is dimensioned to be a sliding fit within the socket aperture 36 of the casing 21. The socket 25 also provides a base flange 41 which has a central, internally screw threaded aperture 42 therethrough. The base flange 41 is formed with a number of spaced tool sockets 43 around its periphery.

The base pin 26 is a straight, externally screw threaded pin which is dimensioned to screw threadedly engage the aperture 42 on the socket 25 and to screw threadedly engage the base of the securing rod 23, as hereinafter described.

The securing rod 23 further includes a first, upper portion 47, the free end of which has a hexagonal outer surface 48, for engagement with a tool. The upper portion 47 also provides an enlarged diameter flange 49 positioned between the free end and the lower part of the securing rod. The securing rod 23 includes a second lower end portion 45 which includes a central internally screw threaded aperture 46, dimensioned to receive the upper end of the base pin 26 in screw threaded engagement. Between the upper and lower ends, the securing rod is formed with a third portion, a reduced diameter portion 50.

The requirement for the portion 50 is that it is of reduced strength compared to the remainder of the securing rod: —obviously, one way of achieving this is to make this portion of reduced diameter, but the same effect could be achieved by making the portion 50 of a lower strength material than the remainder of the rod. Another possibility is to make the reduced strength portion with a different cross-sectional shape.

It is not an essential feature of the invention that the whole of the securing rod 23 is formed integrally: —some applications it may be advantageous to form the reduced strength portion from a different material and connect the three portions of the securing rod together.

The bearing 22 is part cylindrical formed with a small gap 51 down its length and an opposing notch 52 so that the bearing can be eased open to be snapped around the exterior of the portion 50 of the securing rod 23. When in position, the bearing 22 is a close fit around at least a major part of the portion 50 of the securing rod, so as to support the rod in use. Preferably, the bearing 22 is made of a low-friction material which allows relative movement between the rod and the casing, without binding.

The above described securing assembly is used as follows: —before the remaining components are assembled into the casing 21 of each securing assembly, the casing 21 is permanently and rigidly secured in the required position on the tank 60 by welding the casing 31 either directly to the side of the tank or to the tank skirt (not shown), using two parallel lines of welding 35, each extending the full length of the casing 21, down the corners 34 on each side of the flat 33 on each casing 21. The number of securing assemblies used for each tank obviously depends upon the weight and external diameter of the tank.

Once each of the securing assembly casings 21 has been welded to the tank/tank skirt, the remaining components of each securing assembly are assembled as follows: —referring in particular to FIGS. 3 and 4, a flexible washer 55 is positioned on the securing rod 23 just below the flange 49, and a further flexible washer 56 is positioned just above the flange 49. The bearing 22 is snapped around the exterior of the portion 50 of the securing rod 23.

Figure 3:
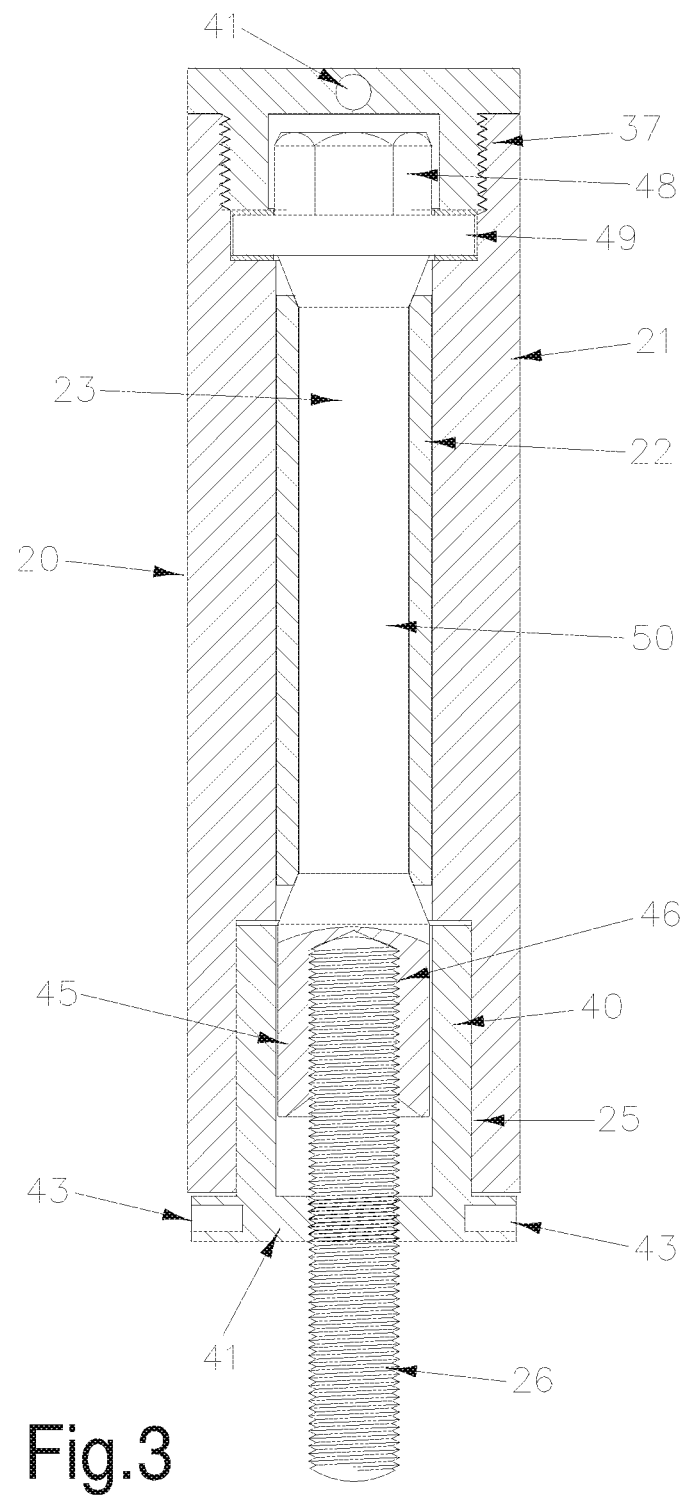
FIG. 3 is a longitudinal section through the assembled parts of FIG. 2.

The socket 25 is slid into the socket aperture 36 of the casing 21, as shown in FIG. 3.

Figure 4:
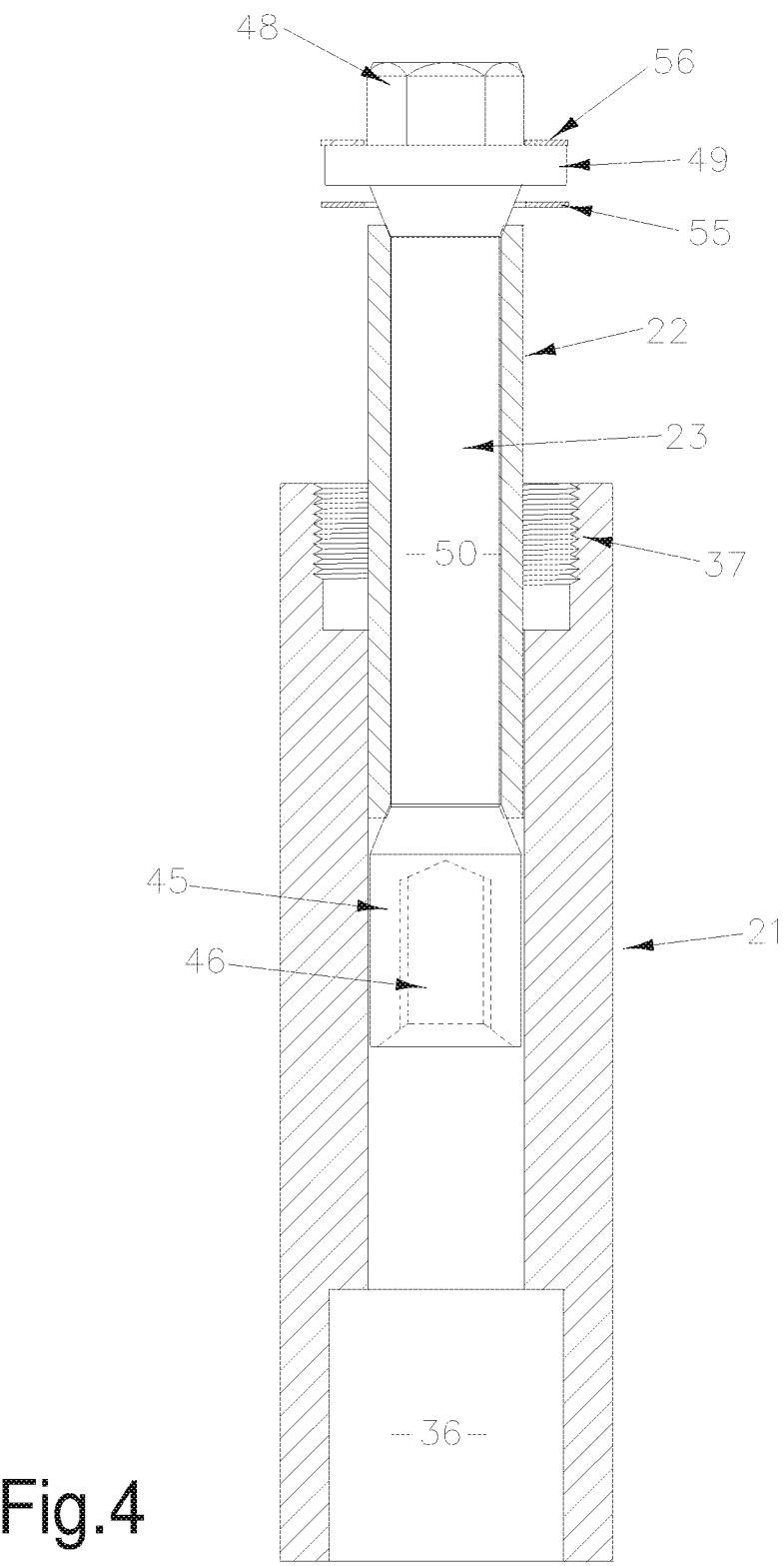
FIG. 4 is a view similar to FIG. 3, but showing the assembly process.
Figure 5:
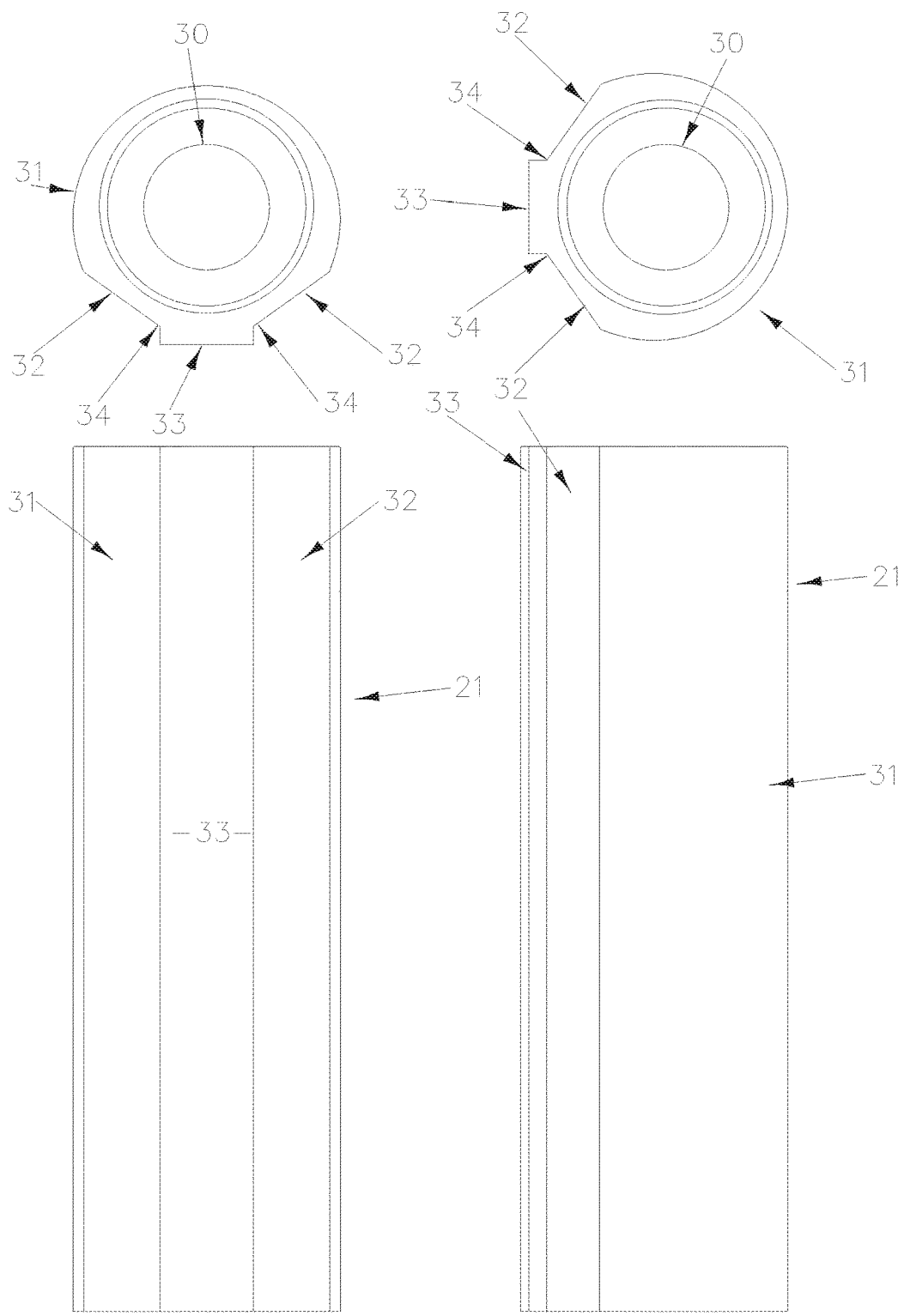
FIG. 5a is a side plus plan of the casing of FIG. 2, from the front.
FIG. 5b is side plus plan of the casing of FIG. 2, from the side.

The securing rod 23 carrying the bearing 22 is then lowered into the casing 21 from the top of the casing, as shown in FIG. 4, until the whole of the securing rod 23 is within the casing, as shown in FIG. 3.

In the position shown in FIG. 3, the flange 49 on the securing rod 23 rests just below the threaded portion of the aperture 37, with the washers 55, 56 one on each side of the flange 49. The lower end portion 45 of the securing rod 23 is a sliding fit within the first portion 40 of the socket 25.

The top 24 is screwed onto the casing 21, with the screw threaded portion 38a engaging the screw threads in the portion 37 of the casing 21. The hexagonal portion 48 at the top of the securing rod fits within the hollow cylindrical portion 38 in the top, such that when the top 24 is completely secured in place as shown in FIG. 3, the securing rod 23 is secured within the casing 21 by the lower surface 38b contacting the washer 56 on top of the flange 49. In this position, the securing rod 23 is in a secure and load transmitting engagement with the casing 21. The tool sockets 41 can be used to receive a suitable tool for tightening the top 24 onto the casing.

The assembled components are then engaged with the base pin 26 by screwing the upper end of the base pin 26 through the screw threaded aperture 42 of the socket 25 and then into the screw threaded aperture 46 of the securing rod 23. This gives a secure load transmitting engagement between the securing rod 23 and the casing 21 via the socket 25 and base pin 26, and also provides (in use) a load transmitting engagement between the floor 61 and the securing assembly. The tool sockets 43 can be used to receive a tool for tightening the socket 25 onto the pin 26.

The position of each securing assembly is then marked on the floor 61 to which the tank 60 is to be secured, and a hole for receiving the lower end of the base pin 26 is formed at each position and is filled with a suitable resin or glue. The tank is then lowered into position vertically, with the base pin 26 of each securing assembly protruding from the base of the securing assembly, and the tank as it is lowered is manoeuvred so that each base pin 26 goes into one of the pre-formed pre-glued holes.

Once the glue has set, the tank 60 is rigidly secured to the floor 61. Movement of the tank is any direction is restrained by the engagement between the casing 21, the securing rod 23, the base pin 26 and the floor 61, as described above.

If the tank comes under an additional load (e.g. because of an earthquake) the securing rods 23 in each of the securing assemblies will of course be subjected to loading in tension, compression or typically, cycles of these forces. An earthquake usually could be expected to cause multiple horizontal shear forces on the tank, plus possibly vertical forces, plus the vertical forces imposed on the rods 23 as the tank tries to overturn as a result of the horizontal shear forces.

It should be noted that the horizontal shear forces in particular are resisted by means of the socket 25 of each securing assembly, bearing against the socket aperture 36 of the casing 21.

In the above described securing assembly each base pin 26 is screwed into a screw threaded aperture 42 of each socket 25. However, it is thought that this might not be necessary and it might instead be preferable to omit the screw threaded aperture 42 of the socket 25, instead forming a non-threaded aperture through the socket 25, through which the base pin 26 passes to engage with the securing rod 23. Another possible variant would be to form a screw thread around the exterior of the first portion 40 of the socket 25, with a matching screw thread formed around the interior of the socket aperture 36 of the casing 21.

As shown in FIG. 6, it is possible to adjust the space inbetween the casing 21 and the floor 61 by screwing more or less of the base pin 26 into or out of the screw threaded aperture 42 (if this is screw threaded), or if the portion 40 and the socket aperture 36 are screw threaded, then the position of the socket 25 relative to the casing 21 can be adjusted by screwing the socket 25 into or out of the socket aperture 36.

Further embodiments of the present invention are described with reference to FIGS. 7-12.

Figure 7:
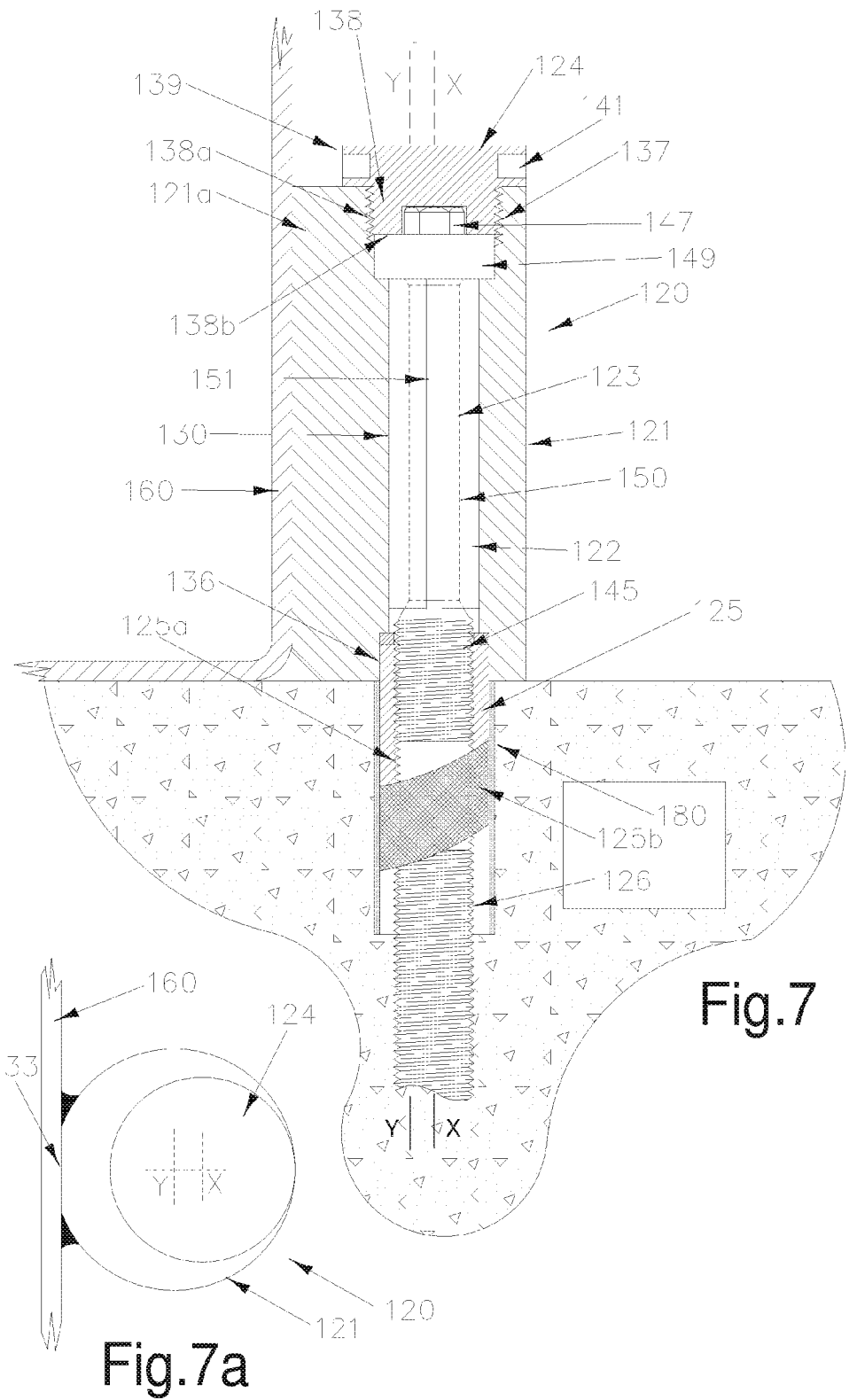
FIG. 7 is a partially sectioned side view of a securing assembly in accordance with a second embodiment of the present invention.

FIG. 7 shows a second embodiment of the invention, which is essentially a simplified version of the first embodiment, i.e. the embodiment of FIGS. 2-6. A securing assembly 120 includes a casing 121, a bearing 122, a securing rod 123, a top 124, a connector in the form of a sleeve 125, and a base pin 126.

The casing 121 is in the form of a hollow cylinder: —a cylindrical bore 130 is formed down the length of the casing, with the longitudinal axis X-X of the bore 130 parallel to, but displaced from, the longitudinal axis Y-Y of the casing. This leaves a greater volume of material in the portion of the casing 121a to be secured to an article to be stabilised, as hereinafter described. The bore 130 has a first end which is uppermost in use and a second end which is lowermost in use.

As shown in FIG. 7a, the exterior of the casing 121 is formed with a flat 133, to facilitate welding the casing to an article to be stabilised.

The inner wall of the casing 121 is reduced in thickness adjacent the base of the casing, to provide a socket 136. Adjacent the top of the casing, the inner wall also is reduced in wall thickness and is screw threaded to provide an internally screw threaded aperture 137.

The top 124 is formed with a hollow cylindrical portion 138 which has an external screw thread 138a and is dimensioned and arranged so as to be engageable with the screw thread on the aperture 137. The top 124 also provides a flange 139 of greater diameter than the screw threaded portion; a series of tool sockets 141 are equidistantly spaced around the perimeter of the flange 139.

The securing rod 123 further includes a first, upper portion 147 the free end of which has a hexagonal outer surface, for engagement with a tool. The upper portion 147 also provides an enlarged diameter flange 149 positioned between the free end and the lower part of the securing rod. The securing rod 123 also includes a second, lower end portion 145 which is externally screw threaded so as to be screw threadedly engageable with a screw thread 125a formed around the interior of the sleeve 125. The exterior surface 125*b* of the sleeve 125 is knurled or roughened to provide a good grip. The base pin 126 is externally screw threaded and the screw thread is sized to be screw threadedly engageable with the screw thread 125 *a* in the interior of the sleeve 125. Between the upper and lower ends, the securing rod 123 is formed with a third portion, a reduced diameter portion 150.

As described with reference to the first embodiment, the requirement for the reduced diameter portion 150 of the rod is that it is of reduced strength compared to the remainder of the rod: —this could be achieved by making the portion of reduced diameter or making it of a lower strength material or with a different cross-sectional shape. The securing rod 123 is described as having the whole of its length formed integrally, but this is not essential: —the upper and lower portions could be formed separately from the reduced strength portion.

The bearing 122 is part cylindrical, formed with a small gap 151 down its length, and an opposing notch (not visible) so that the bearing can be eased open to be snapped around the exterior of the portion 150 of the securing rod. When in position, the bearing 122 is a close fit around at least a major part of the portion 150 of the securing rod, so as to support the rod in use. As for the first embodiment, the bearing may be made of a low-friction material.

The securing assembly shown in FIG. 7 is used as follows: for each securing assembly to be used on a tank 160, the position of the securing assembly is established, and each pin 126 is screwed into the corresponding sleeve 125, and the free end of the pin 126 plus the adjacent part of the sleeve 125 are then glued as indicated at 180 or otherwise secured into the surface underlying the tank, leaving the upper part of each sleeve 125 projecting from the surface. For each securing assembly, the casing 121 is correctly positioned by engaging the upper part of the corresponding sleeve 125 with the socket 136 in the base of the casing. Each casing is then permanently and rigidly secured in the required position on the tank 160, by placing the flat 133 of the casing flat against the side of the tank or the tank skirt (if present) and welding the casing to the tank/skirt using two parallel lines of welding extending down the sides of the flat 133.

It will be appreciated that the number of securing assemblies used to secure each tank will depend upon the weight and external diameter of the tank.

Once each of the casings 121 has been welded to the tank/tank skirt, the remaining components of each securing assembly are assembled as follows: —flexible washers (not shown) are positioned below and above the flange 149, and the bearing 122 is snapped around the exterior of the portion 150 of the securing rod 123.

The securing rod 123 carrying the bearing 122 is then slid into the bore of the casing 121 from the top of the casing, until the whole of the securing rod 123 is within the casing as shown in FIG. 7. In this position, the flange 149 rests just below the threaded portion of the aperture 137, and the lower end portion 145 of the rod lies within the socket 136. The securing rod 123 is then rotated (using a tool engaged with the hexagonal upper end of the rod) to screw the lower end portion 145 of the securing rod 123 into the sleeve 125.

The top 124 is screwed onto the casing 121, with the screw threaded portion 138*a* engaging the screw threads in the portion 137 of the casing 121. The hexagonal portion at the top of the securing rod fits within the hollow cylindrical portion 138 in the top, such that when the top 124 is completely secured in place as shown in FIG. 7, the securing rod 123 is secured within the casing by the lower surface 138*b* of the top contacting the washer (not shown) on top of the flange 149. In this position, the securing rod 123 is a secure and load transmitting engagement with the casing 121. The sockets 141 can be used to engage a suitable tool for tightening the top 124 onto the casing.

It will be appreciated that in the above described embodiment, the sleeve 125 extends up into the casing, and thus can transfer shear stresses created by relative horizontal movement of the tank and the underlying surface, to the casing. The distance by which the sleeve 125 extends into the socket 136 in the base of the casing can of course be adjusted as necessary, depending upon the expected level of shear stresses to be transferred: —see the embodiment described with reference to FIG. 9.

Figure 8:
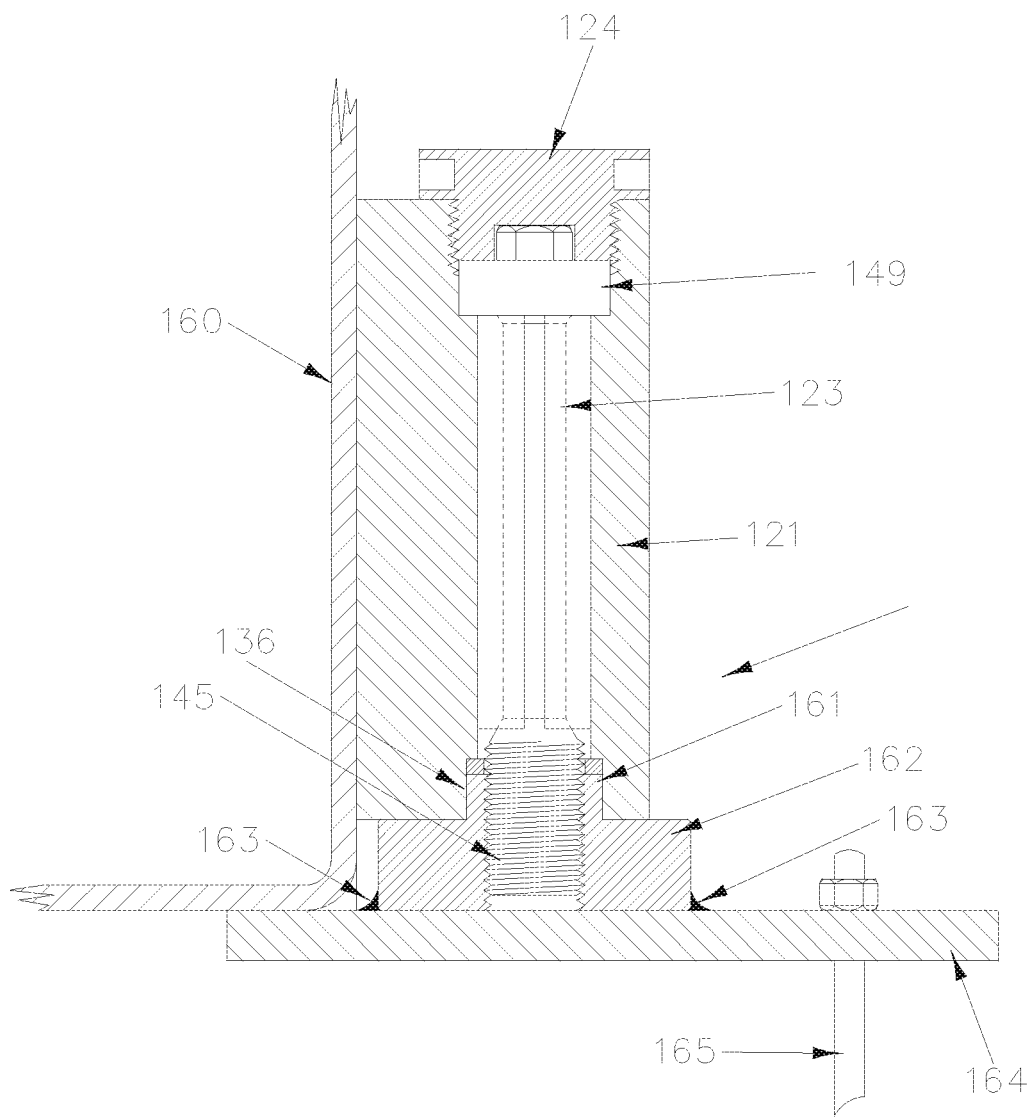
FIG. 8 is a partially sectioned side view of a securing assembly in accordance with a third embodiment of the present invention.

FIG. 8 shows a third embodiment of the present invention. Essentially, the third embodiment is a modification of the second embodiment shown in FIG. 7, and the third embodiment is the same as the second embodiment except in the particulars described below; the same reference numerals are used where the components are identical.

In the third embodiment shown in FIG. 8, the lower end portion 145 of the securing rod 123 is formed with an external screw thread as in the second embodiment, but in the third embodiment, this screw thread engages with a connector in the form of an internally screw threaded boss 161, which projects from the upper surface of a larger diameter flange 162.

The flange 162 may be apertured (not shown) at spaced intervals to allow the flange to be bolted down to an underlying surface and/or the flange 162 may be welded with a weld 163 around its lower edge, to secure the flange to an underlying baseplate 164. The baseplate 164 itself may be secured to the underlying surface by any suitable means, e.g. hold down bolts 165 as shown.

It will be noted that the boss 161 extends upwards into the socket 136 formed in the casing. As with the second embodiment described above, this overlap assists in the transfer of shear stresses; the overlap may be increased depending upon the expected level of shear stresses.

The third embodiment is used as follows: for each securing assembly to be used on a tank 160 the position of the securing assembly is established, and each flange 162 is welded at the selected position as shown in FIG. 8. Each corresponding casing 121 is then correctly positioned by locating the boss 161 of the flange 162 into the socket 136 in the casing. Each casing is then permanently rigidly secured in the required position on the tank 160, by placing the flat 133 of the casing flat against the side of the tank or the tank skirt (if present) and welding the casing to the tank/skirt using two parallel lines of welding extending down the sides of the flat 133.

As with the second embodiment, the total number of securing assemblies used depends upon the weight of external diameter of the tank.

Once the above steps are completed, the remaining components of the securing assembly are assembled as described with reference to the second embodiment, the only difference in assembly being that the lower end portion 145 of the rod is in screw threaded engagement with the internal screw thread of the boss 161.

Figure 9:
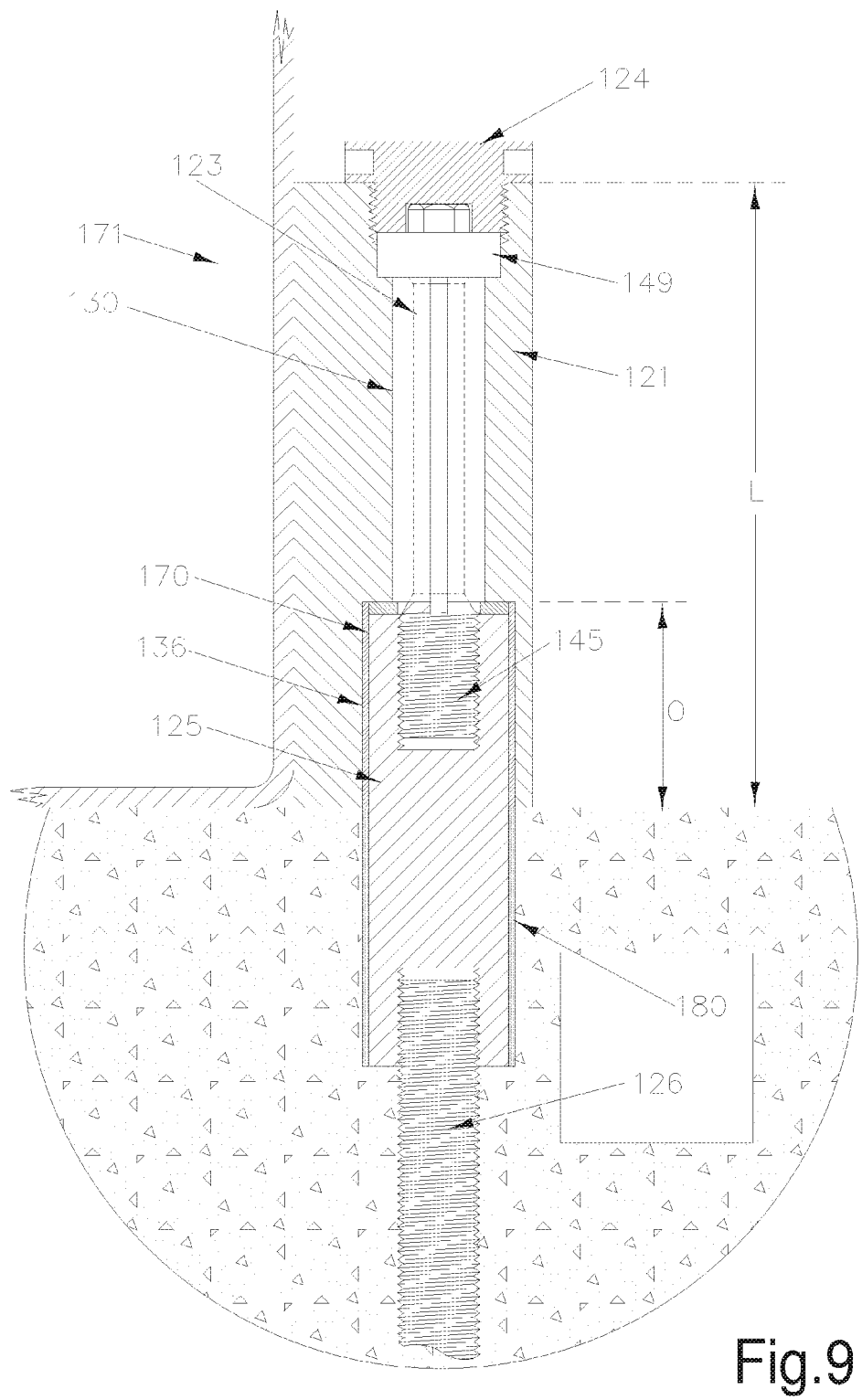
FIG. 9 is a partially sectioned side view of a securing assembly in accordance with a fourth embodiment of the present invention.

Referring to FIG. 9, the fourth embodiment of the present invention essentially is a variant of the second embodiment described with reference to FIG. 7, but providing an increased length of overlap O between the socket 136 formed in the base of the casing, and the internally screw threaded sleeve 125. In addition, the exterior surface of the sleeve 125 which lies within the socket 136 is provided with a low friction bearing 170 which lies between the sleeve 125 and the socket 136. The length of overlap preferably is about one third-one half of the overall length L of the casing 121. In all other respects, the securing assembly shown in FIG. 9 is the same as described with reference to FIG. 7, and the same reference numerals are used where appropriate.

The embodiment shown in FIG. 9 is used in the same manner as the embodiment described with reference to FIG. 7.

The increased overlap between the socket 136 and the sleeve 125, and the use of the low friction bearing 170 makes this embodiment particularly suitable for securing a tank 171 where the securing assembly is connected directly to the side of the tank, rather than to a tank skirt. If a tank skirt is present, the usual procedure is to fill the area created by the skirt beneath the tank with concrete—this stabilises and strengthens the tank plus skirt assembly. When the securing assemblies are connected to a tank skirt which has been reinforced in this way, the tank plus skirt together have a high degree of flexual stability, and this greatly reduces the tendency for the tank to buckle against the securing assemblies, even under high loading.

However, when no skirt is present and the securing assemblies are connected directly to the tank, problems can arise because the tank, even if filled, is not sufficiently strong to withstand the flexure arising out of the horizontal eccentricity between the applied vertical force in the tank wall and the reaction in base pin 126. Increasing the overlap between the socket 136 and the sleeve 125 assists in efficient transmission of flexure from the tank to the underlying ground by the securing assemblies; this reduces the tendency of a tank 171 to buckle at the securing assemblies.

The use of the low friction bearing 170 assists in allowing the casing 121 to slide over the sleeve 125 as the securing rod 123 yields in tension/compression.

Figure 10:
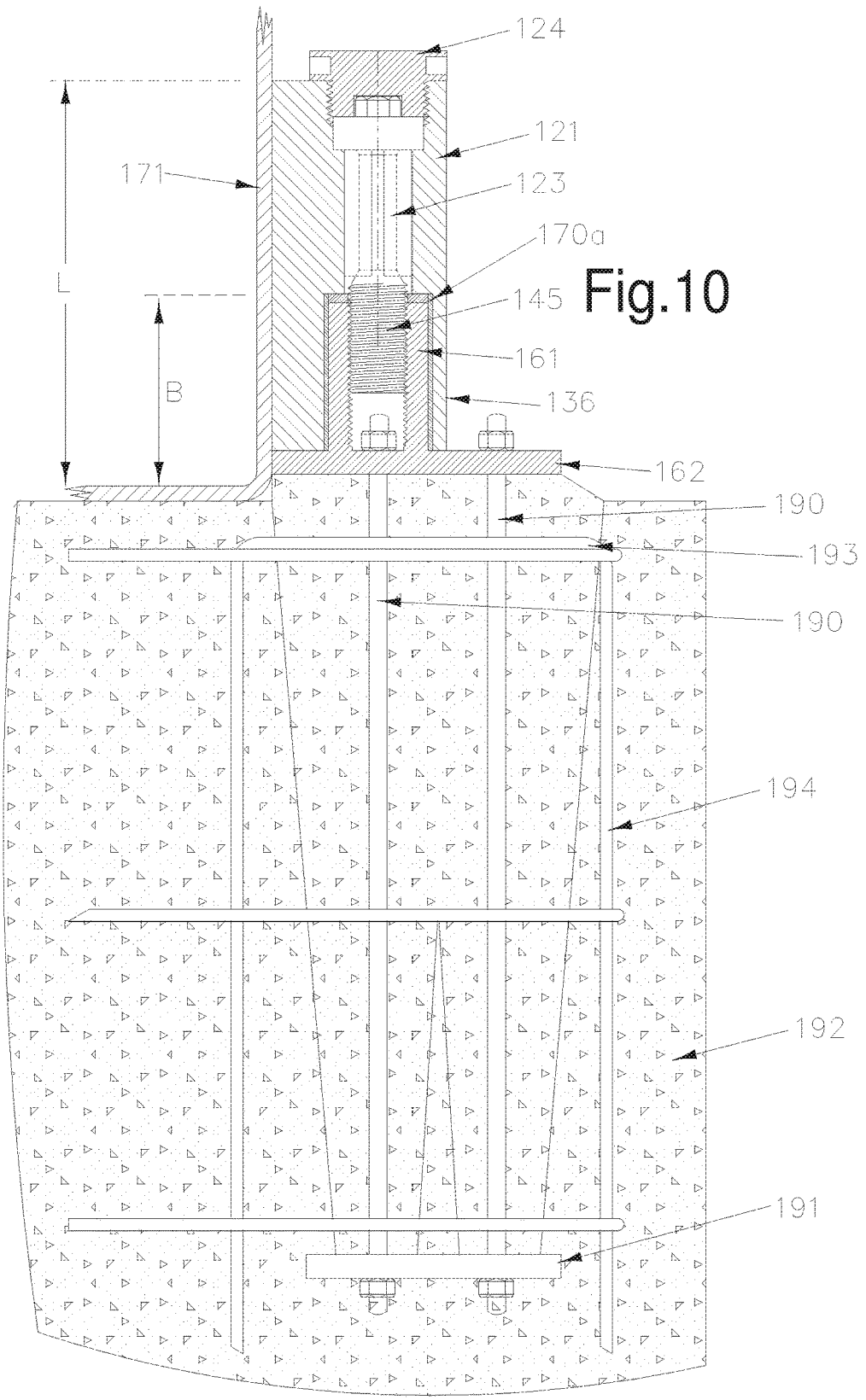
FIG. 10 is a partially sectioned side view of a securing assembly in accordance with a fifth embodiment of the present invention.

FIG. 10 illustrates a fifth embodiment, which is similar to the third embodiment shown in FIG. 8, but providing an increased length of overlap between the socket 136 formed in the base of the casing and the internally screw threaded boss 161: —as shown in FIG. 10, the boss 161 extends into the casing 121 by a length B equal to about one third to a half of the overall length L of the casing.

A low friction bearing 170a optionally may be positioned between the boss 161 and the casing 121, allowing the casing to slide over the boss 161 as the securing rod 123 yields in tension/compression.

In all other respects, the securing assembly shown in FIG. 10 is the same as described with reference to FIG. 8, and the same reference numerals are used where appropriate.

The embodiment shown in FIG. 10 is used in the same manner as the FIG. 8 embodiment. However, in the variant shown in FIG. 10, the flange 162 is not welded onto an underlying plate as shown with reference to the FIG. 8 embodiment, but is secured using a plurality of bolts 190, the lower ends of which are secured to an anchor plate 191 set in concrete 192. To assist in transferring forces to the concrete, stirrups 193 and hairpins 194 may be used in known manner.

It will be appreciated that the embodiment shown in FIG. 10 provides the same advantages as the embodiment described with reference to FIG. 9, in that the increased overlap between the socket 136 and the boss 161 means that the embodiment is particularly suitable for securing a tank 171 which does not have a skirt, and where the securing assemblies are connected directly to the side of the tank.

It should be noted that in a typical earthquake, there is no single movement in one direction: —instead, there are repeated movements in several directions, so that in a single earthquake, each of the rods is likely to be deformed repeatedly in both tension and compression. This is likely to cause strain hardening, so normal good practice would be to inspect and replace (if needed) each of the rods after a significant seismic event.

If these forces cause a loading on any of the rods 23/123 which is within the elastic range of the rod material, then each rod will return to its original shape when the loading ceases. However, if the loading on any of the rods exceeds the yield strength of the material, (i.e. exceeds the elastic deformation range) permanent deformation of the rod will result. The portion of the rod which will tend to be deformed is the reduced strength portion 50/150, and the presence of the bearing 22/122 assists in keeping the rod straight and correctly aligned and in particular assists the rod to resist buckling in compression.

In the event that the rod is plastically deformed because of excessive loading on the tank, the rod 23/123 can be replaced by removing the top 24/124, unscrewing the rod 23/123 from the base pin 26/126 and reassembling with a new, undamaged rod; the bearing 22/122 also can be replaced if necessary.

The materials of which the securing assembly is made may be selected from a range of suitable materials, depending upon the size and weight of the article to be restrained. The materials and geometry should be selected with the object that the securing assemblies used are sufficiently strong to retain all normal movements of the tank, but that if excessive movement of the tank occurs, (e.g. as in an earthquake) then the portion 50/150 of each rod 23/123 will be first elastically, then plastically, deformed before the tank is damaged or the securing assembly is ripped away from the tank, or the base pins 26 are pulled out of the floor.

By way of example, for use with wine tanks, the casing 31/131 preferably is a stainless steel, the base pin 26/126 is a high tensile steel, and at least the lower strength portion 50/150 of the securing rod 23/123 is a ductile mild steel. The bearing 22/122 is a suitable plastics material.

It will be appreciated that the above described securing assemblies provide a robust and relatively low-cost means for securing an article. Further, the components of the securing assembly can be easily checked for damage, and is straightforward to replace without damage to the article or to the underlying floor.

Figure 11:
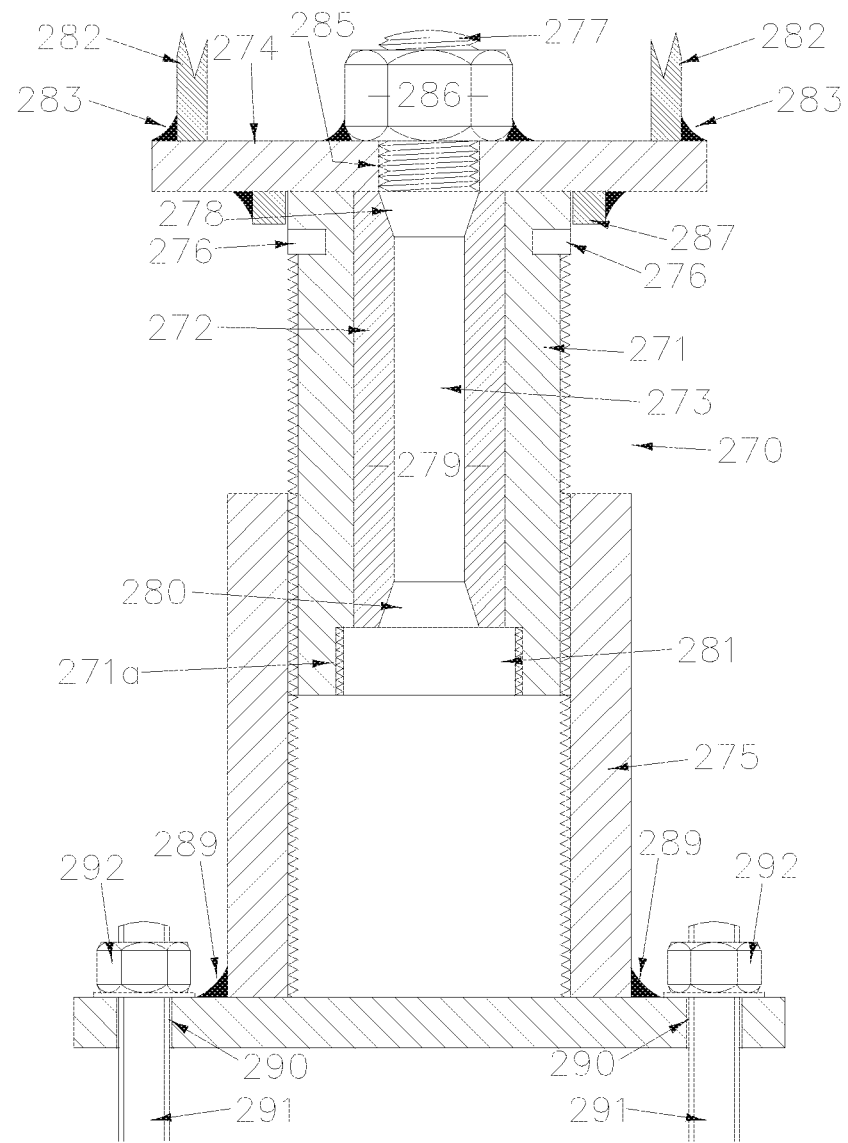
FIG. 11 is a section through a securing assembly in accordance with a sixth embodiment of the present invention.
Figure 12:
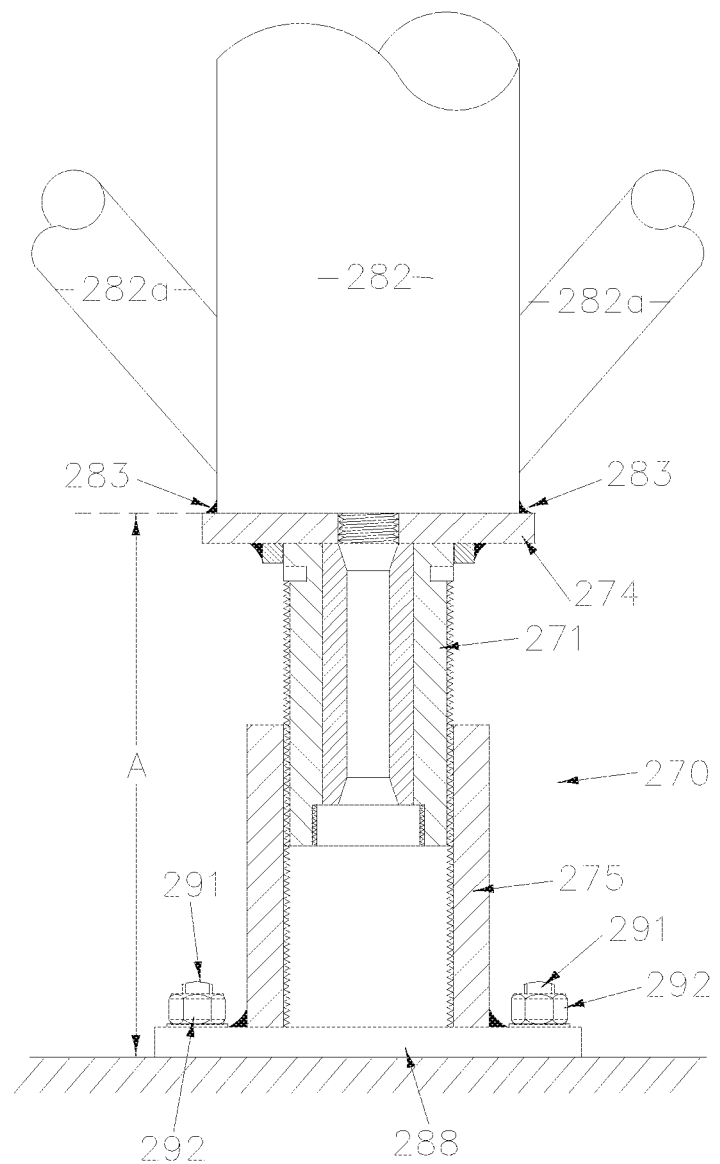
FIG. 12 is a diagram showing the securing assembly of FIG. 11 mounted on the supporting leg of a tank.

The embodiment shown in FIGS. 11 and 12 is a securing assembly for tanks which are mounted on legs. It will be appreciated that if a tank (e.g. a wine tank) is mounted on legs, this makes the overall centre of gravity of the tank higher and the tanks are more susceptible to tipping. In addition, the legs may buckle or fail completely under seismic loading. Nevertheless, there are a large number of existing tanks which are constructed this way, and it is desirable to be able to provide a securing assembly which can effectively stabilise tanks mounted on legs. In this embodiment, the securing assembly is used to secure the tank legs rather than being directly connected to the tank. The tank legs of course are rigidly connected to the tank, so that the securing assembly is indirectly connected to the tank as well.

Referring to FIG. 11, a securing assembly 270 in accordance with the present invention includes a casing 271, a bearing 272, a securing rod 273, a top plate 274 and a base socket 275.

The casing 271 is in the form of a hollow cylinder, which is externally screw threaded along a major portion of its length, so that the casing can be screwed into and out of engagement with the base socket 275, which is in the form of an internally screw threaded hollow cylinder.

The casing 271 is formed with one or more pairs of diametrically opposed slots 276, for engagement with a spanner as hereinafter described. The casing 271 also provides a screw threaded internal socket 271*a*, located and dimensioned to receive the securing rod 273 as hereinafter described.

The securing rod 273 provides an upper portion 277 which is cylindrical and externally screw threaded, a first conical portion 278 formed integrally with the portion 277, an intermediate reduced diameter cylindrical portion 279, a second conical portion 280 and an externally screw threaded cylindrical base portion 281.

The requirement for the intermediate portion 279 is that it is of reduced strength compared to the remainder of the securing rod. Obviously, one way of achieving this is to make this portion of reduced diameter, as shown, but the same effect could be achieved by making the intermediate portion 279 of lower strength material than the remainder of the rod, or with a different cross-sectional shape.

It is not an essential feature of the invention that the whole of the securing rod is formed integrally: —for some applications, it may be advantageous to form the reduced strength portion 279 from a different material, connected to the remaining portions.

The bearing 272 may be made from any suitable plastics materials and is part cylindrical, formed with a small gap (not visible) down its length and a diametrically opposed notch, so that the bearing can be eased open to be snapped around the exterior of at least the intermediate portion 279 of the securing rod 273. As shown in FIG. 11, the bearing 272 is shaped internally so that the bearing also fits around the first and second conical portions 278, 280 of the securing rod.

When in position, the bearing 272 is a close fit around the corresponding portions of the securing rod, so as to support the rod in use.

Before fitting to a tank, the components of the securing assembly 270 are preassembled. The top plate 274 is a flat plate formed with a central internally screw threaded hole 285 which has a nut 286 welded around it. On the opposite side of the plate 274 a shear transfer ring 287 is welded to the plate, concentrically with the hole 285. The internal diameter of the shear transfer ring 287 is slightly larger than the external diameter of the casing 271, so that the casing 271 is a sliding fit inside the shear transfer ring, and in use, the ring transfers any shear forces to the casing 271.

The bearing 272 is snapped into place around the securing rod 273 and the securing rod 273 and bearing 272 are then secured inside the casing 271 by screwing the cylindrical base portion 281 into the correspondingly screw threaded socket 271*a* formed adjacent the base of the casing. The exterior of the casing 271 is screwed into the base socket 275, as shown in FIG. 11.

The above described components are used to secure a tank as follows: —as shown in FIG. 12 the securing assembly 270 is substituted for the lower part of some or all of the supporting legs 282 of a tank. In known manner, each of the supporting legs 282 is a hollow cylindrical column extending between the underside of a tank (not shown) and a supporting base plate secured to the ground. Each leg may be cross braced by braces 282*a* (existing or retrofitted).

For each of the legs 282 to be fitted with the securing assembly 270, the lower portion A of the leg is removed and the securing assembly 270 is fitted in its place. The top plate 274 of the securing assembly is sized to be slightly larger than the outer diameter of the leg 282 and is secured over the end of the leg 282 by a weld 283 around the outer circumference of the leg 282.

The base socket 275 of the securing assembly is welded to a base plate 288 by a circumferential weld 289. The base plate 288 is provided with a plurality of holes 290, (two of which are shown) for receiving anchor pins 291 which are cast into the underlying ground using concrete or secured to sockets in the underlying concrete using an adhesive, in known manner.

The base socket 275, with the casing 271 attached, is screwed over the casing 271 to reduce the overall height of the assembly as much as possible, and the base plate 288 secured to the base socket 275 is then positioned with the holes 290 over the corresponding anchor pins 291, and is secured in place by securing nuts 292 over the tops of the anchor pins.

A spanner is then engaged with the sockets 276 on the casing 271 and the casing 271 is rotated to extend it out of the base socket 275 until the upper portion 277 of the securing rod 273 extends through the hole 285 in the top plate 274 and engages the securing nut 86 secured over the hole 285. Rotation of the casing 271 is continued until the upper edge of the casing 271 is tight against the underside of the top plate 274. This completes the installation.

It will be appreciated that the screw threaded connection between the casing 271 and the socket 275 allows considerable leeway in the adjustment of the overall length of the securing assembly, to accommodate variations in height between the ends of the legs 282 and the underlying ground surface.

Once securing assembly 220 has been installed as described above the tank is rigidly secured to the floor via the securing assemblies connected to the legs. Movement of the tank in any direction is restrained by the engagement between the casing 271, the securing rod 273, the base socket 275 and the top and bottom plates 274, 288, as described above. Tension forces are transmitted through the securing rod, compression forces are transmitted through the casing, and shear forces are transferred to the casing 271 by the shear transfer ring 287.

If the tank comes under an additional load (e.g. because of an earthquake) the securing rod 273 in each of the securing assemblies will of course be subjected to loading in tension, compression or (typically) cycles of these forces. An earthquake usually could be expected to cause multiple horizontal shear forces on the tank, plus possibly vertical forces, plus the vertical forces imposed on the rod 273 as the tank tries to overturn as a result of horizontal shear forces.

It should be noted that in a typical earthquake, there is no single movement in one direction: —instead, there are repeated movements in several directions, so that in a single earthquake, each of the securing rod 273 is likely to be deformed repeatedly in both tension and compression. This is likely to cause strain hardening, so normal good practice would be to inspect and replace (if needed) each of the rods 273 after a significant seismic event.

If the forces cause a loading on any of the rods 273 which is within the elastic range of the rod material, then the rod will return to its original shape when the loading ceases. However, if the loading on any of the rods exceeds the yield strength of the material (i.e. exceeds the elastic deformation range) permanent deformation of the rod will result. The portion of the rod which will tend to be deformed is the reduced strength portion 279, and the presence of the bearing 272 assists in keeping the rod straight and correctly aligned, and in particular assists the rod to resist buckling in compression.

In the event that the rod is plastically deformed because of excessive loading on the tank, the rod 273 can be replaced by releasing the nuts 292, rotating the casing 271 with a spanner to disengage the securing rod 273 from the nut 286 on the top plate 274 and lowering the casing 271 into the base socket 275 until there is sufficient clearance to lift the securing assembly off the pins 291, to allow the casing 271 to be screwed right out of engagement with the base of 275. The securing rod 273 (and possibly also the bearing 272) can then be replaced. The components are then reassembled and reinstalled as described above.

In all of the above-described embodiments, it will be appreciated that any equivalent connection (e.g. a twist-lock connection) may be substituted for the described screw-threaded connections, unless it is necessary to permit the adjustment of the overall length of the joined components (e.g. as for the casing 271 and the socket 275 in the embodiment shown in FIG. 11.

The materials of which a securing assembly is made may be selected from a range of suitable materials, depending upon the size and weight of the article to be restrained. The materials should be selected with the objective that the securing assemblies used are sufficiently strong to restrain all normal movements of the tank or other article, but that if excessive movement occurs (as in an earthquake) then the portion 279 of each rod 273 will be first elastically, then plastically, deformed before the article is damaged or the securing assembly is ripped away from the leg 282, or the base pins 291 are pulled out of the floor. It will be appreciated that the material of portion 279 should be sufficiently ductile to sustain the expected level of plastic deformation.

By way of example, for use with wine tanks, the casing 271 and base socket 275 usually are stainless steel and at least the lower strength portion 279 of the securing rod 273 is a ductile mild steel.

It will be appreciated that the above described securing assembly provides a robust and relatively low-cost means for securing an article. Further, the components of the securing assembly can easily be checked for damage, and damaged components can be replaced without damage to the article or to the underlying floor.

Essentially, the securing in assembly of the present invention is a damage limiting device, with the securing rod designed as a weak point, so that in a majority of overload events, the damage is limited to the securing rod or possibly the securing rod plus the casing if the overload is very large. The forces applied to the legs and to the tank are to some extent limited by what can be transmitted to them through the securing rods. Further, the securing assembly of the present invention reduces the level of load applied to the tank by providing hysteretic damping to the system through tension and compression yielding of the ductile securing rod.

The invention claimed is:

1. A securing assembly for an article, said securing assembly being capable of securing against both tensile and compressive forces, and including:
    a casing which in use is rigidly attached to an article to be secured, said casing having a first end which is uppermost in use and a second end which is lowermost in use and wherein the casing is formed with a bore therethrough extending between said first and second ends;
    a securing rod which is adapted to be releasably connectable between a floor underlying an article to be secured and said article;
    the securing rod providing a first portion at one end thereof and a second portion at another end thereof, and a third portion having reduced strength compared to said first and second portions, between said first and second portions;
    a bearing dimensioned and arranged to surround at least a major portion of said third part portion of said securing rod;
    said casing being arranged to completely surround and contain at least said third portion of said securing rod, at least said third portion of the securing rod and a corresponding part of the bearing being an unthreaded sliding fit within said bore;
    said casing being in load transmitting engagement with said securing rod.

2. The securing assembly as claimed in claim 1 wherein the casing is in the form of a cylinder.

3. The securing assembly as claimed in claim 1 wherein the longitudinal axis of said bore is parallel to, but displaced from the longitudinal axis of the casing.

4. The securing assembly as claimed in claim 1, wherein a first end of the bore is provided with a removable top, one face of which is formed with a cavity dimensioned to receive at least part of the first portion of the securing rod, such that when said removable top is secured in position over said first end of the bore, said removable top provides a load transmitting engagement between said securing rod and said casing.

5. The securing assembly as claimed in claim 4 wherein said removable top is engageable with said first end of the bore by means of a screw-thread or a twist-lock engagement.

6. The securing assembly as claimed in claim 1, wherein the second portion of the securing rod is provided with a screw thread for connection between the securing rod and said floor.

7. The securing assembly as claimed in claim 6 wherein the second portion of the securing rod is internally screw threaded, for screw threaded engagement with an externally screw threaded base pin which is securable to said floor.

8. The securing assembly as claimed in claim 6 wherein the second portion of the rod is externally screw threaded for screw threaded engagement with an internally screw threaded connector.

9. The securing assembly as claimed in claim 8 wherein the internally screw threaded connector also is screw threadedly engageable with an externally screw threaded base pin which is securable to said floor.

10. The securing assembly as claimed in claim 8 wherein the internally screw threaded connector is securable to the floor or to a base plate secured to the floor.

11. The securing assembly as claimed in claim 8, wherein the internally screw threaded connector extends into the second end of the bore.

12. The securing assembly as claimed in claim 11 wherein the internally screw threaded connector extends into the second end of the bore by a distance equal to about one third to one half of the length of the casing.

13. The securing assembly as claimed in claim 12 wherein at least a major portion of the internally screw threaded connector extending into the second end of the bore is surrounded by a friction bearing.

14. The securing assembly as claimed in claim 1 wherein the first end of the casing is closed by a plate rigidly secured thereto, said plate having an aperture therethrough for receiving at least part of the first portion of the securing rod, and said plate being provided with means for releasably securing the first portion of the securing rod to the plate.

15. The securing assembly as claimed in claim 14 wherein said means for securing the first portion of the securing rod to the plate is an internally screw threaded connector dimensioned to receive and engage an external screw thread formed on said at least part of the first portion of the securing rod.

16. The securing assembly as claimed in claim 14, wherein the second portion of the securing rod is releasably securable to the casing by means of a screw threaded engagement or a twist-lock engagement.

17. The securing assembly as claimed in claim 14, wherein the casing is provided with an external screw thread over at least part of a length of the casing, and the securing assembly further includes an internally screw threaded base socket which is dimensioned and arranged to be screw threadedly engageable with the casing such that an overall length of the casing and the internally screw threaded base socket can be adjusted by screwing the casing into or out of the internally screw threaded base socket.

18. The securing assembly as claimed in claim 1, wherein the first, second and third portions of the securing rod are formed integrally, and the third portion is of smaller cross-section than the first and second portions, to provide a reduced strength compared to said first and second portions.

19. The securing assembly as claimed in claim 1, wherein the first, second and third portion of the securing rod are formed integrally, and the third portion is of different cross-sectional shape to the first and second portions, to provide a reduced strength compared to said first and second portions.

20. The securing assembly as claimed in claim 1, wherein the first, second and third portions of the securing rod are made from different materials, to provide a reduced strength for the third portion compared to said first and second portions.

21. The securing assembly as claimed in claim 1 wherein the bearing is formed as a slotted cylindrical sleeve adapted to be snap fitted over at least the third portion of the securing rod.

* * * * *